United States Patent [19]
de Vecchis et al.

[11] 4,155,963
[45] May 22, 1979

[54] IN-LINE MANUFACTURE OF OPTICAL FIBRES CABLES WITH SEQUENTIAL LAYING

[75] Inventors: Michel de Vecchis; Maurice Arnaud, both of Paris, France

[73] Assignee: Societe Lignes Telegraphiques et Telephoniques, Paris, France

[21] Appl. No.: 897,713

[22] Filed: Apr. 19, 1978

[30] Foreign Application Priority Data

Apr. 27, 1977 [FR] France .................. 77 12673

[51] Int. Cl.² ........................... G02B 5/14; B32B 5/02
[52] U.S. Cl. .................................. 264/1; 156/171; 156/172; 156/244.12; 156/244.15; 264/174; 264/177 R; 264/249; 264/276; 264/271; 350/96.23
[58] Field of Search ............... 156/166, 172, 171, 149, 156/169, 293, 294, 298, 244.12, 244.13, 244.15, 47, 53; 264/1, 171, 271, 296, 249, 174, 177 R; 350/96.23; 174/70 R

[56] References Cited

FOREIGN PATENT DOCUMENTS

| | | |
|---|---|---|
| 2509547 | 9/1976 | Fed. Rep. of Germany ........ 350/96.23 |
| 2519050 | 4/1976 | Fed. Rep. of Germany ........ 350/96.23 |
| 2312788 | 12/1976 | France .................................. 350/96.23 |

Primary Examiner—Michael W. Ball
Attorney, Agent, or Firm—Kemon & Estabrook

[57] ABSTRACT

A cable comprising a central armour, a dielectric helically grooved core and optical fibres housed in said grooves which are formed with a lip protruding from one edge is produced by extrusion of the profiled core on the armour heating of the core, laying of one fibre within one groove with the aid of a fibre guide controlled by a positioning slot in said core, bending the lip to close the groove outwardly and repeating said heating, laying, etc. . . for each fibre and taping the structure.

6 Claims, 7 Drawing Figures

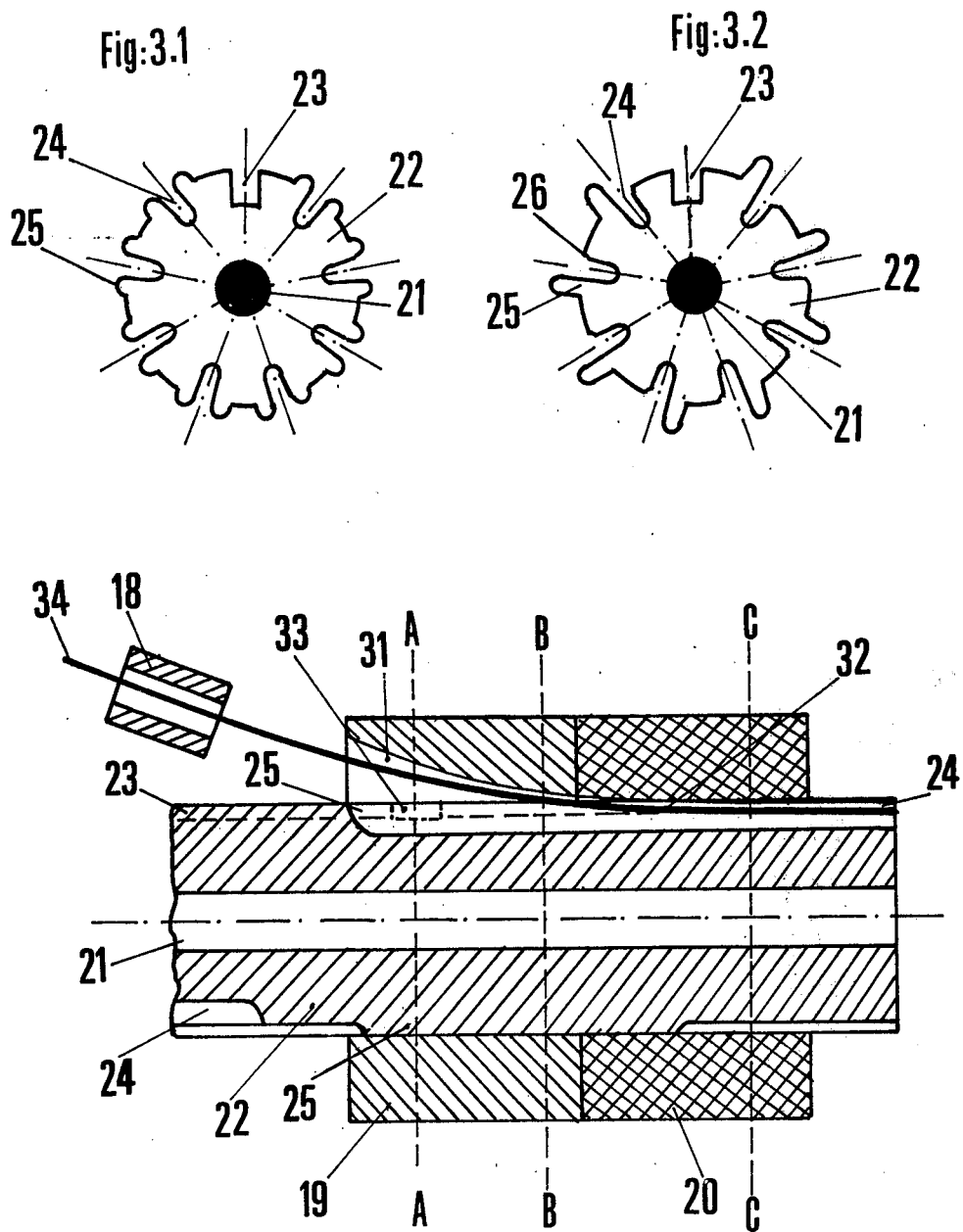

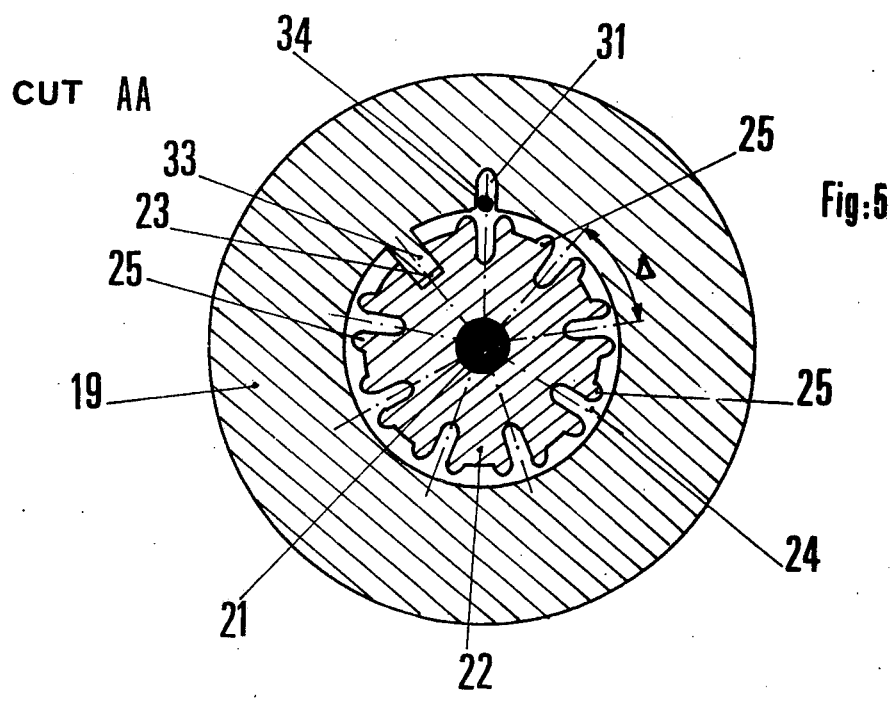
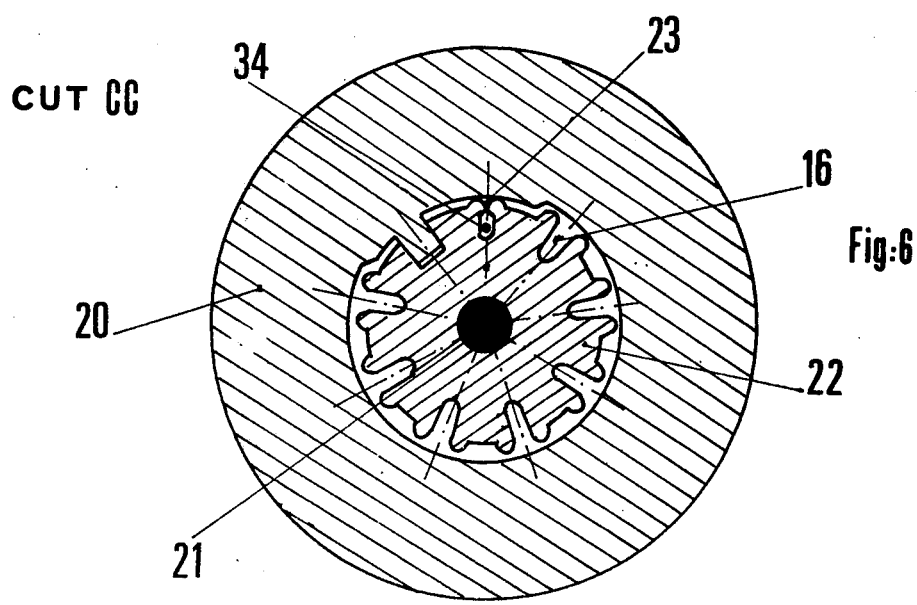

IN-LINE MANUFACTURE OF OPTICAL FIBRES CABLES WITH SEQUENTIAL LAYING

BACKGROUND OF THE INVENTION

The invention concerns the line production of cable elements utilizing optical fibres for the transmission of signals.

There have been described for instance in the French Patent Application No. 2 358 666 filed on Dec. 30, 1975, cable elements comprising a central armour of high mechanical strength, on which a grooved core housing the fibres is extruded, the core is surrounded by an envelope formed of one or more layers. In U.S. Patent Application Ser. No. 877,872 filed on Feb. 15, 1978, for "Cable incorporating optical fibres" by one of the co-inventors, structural variants of cable elements are disclosed which may also be produced by the process according to the present invention.

SUMMARY OF THE INVENTION

The process for the line production of cable elements comprising a rigid armour surrounded by a cylindrical profiled core of which the periphery is formed with helical grooves housing optical fibres laid lengthwise, the said grooves being at least partially closed by lips forming an extension of their edges in accordance with the aforesaid second patent application, is characterized by the following steps:
(1) slowly rotating and pulling said rigid armour;
(2) extruding around said core an insulating core with a grooved profile, in which each groove edge is prolonged by at least one lip and of which the symmetry is broken by a positioning slot having no lips;
(3) cooling the insulating core;
(4) heating the core for expansion;
(5) laying an optical fibre into one groove;
(6) locally heating the lips belonging said one groove;
(7) bending over of the lip or lips at the periphery of the groove occupied by the fibre;
(8) repetition of the operations 5-6 and 7 on the successive grooves;
(9) taping of the element;
(10) winding the element on a tape-up reel.

An apparatus for carrying out the process according to the invention comprises a rotating take off reel for the supply of the central armour, a fixed extruder which coats the core with an insulating material according to a grooved profile, of which the groove edges comprise lips, a device for temperature adjustment which effects the cooling of the extruded material by immersion, followed by drying of the core in hot air, a fixed set of units for sequentially laying the optical fibres, each comprising:
—a device for heating the core
—a controlled supply reel which delivers an optical fibre
—a guide for the optical fibre in one groove
—a devide for the heating of the lips of the said groove
—a device for bending over the lips, and a rotating taping device and a rotating take-up means.

The process according to the invention affords the following advantages:
—it makes it possible to lay the optical fibres without exerting any tractive force thereon;
—it limits the displacements of the optical fibres as soon as they have reached their respective grooves without interfering with the movements of small amplitude;
—it affords mechanical protection to the fibres as they are positioned by closing the grooves by bending over the lips;
—the taping of the finished cable element constitutes an additional safety measure intended to avoid re-opening of the lips of the grooves and to improve the protection of the fibres;
—it involves only operations currently employed in cable making.

BRIEF DESCRIPTION OF THE DRAWINGS

The following description is accompanied by FIGS. 1 to 6, which are given purely by way of illustration and have no limiting character, and in which:

FIGS. 3.1 and 3.2 are two cross sections through a dielectric core extruded on to the rigid central armour in conformity with the process of the invention, FIG. 4 is a longitudinal sectional view of a cable element section during the laying of an optical fibre, and FIGS. 5 and 6 are two transverse sectional views corresponding to the preceding figure.

DETAILED DESCRIPTION OF THE DRAWINGS

Figure 1:
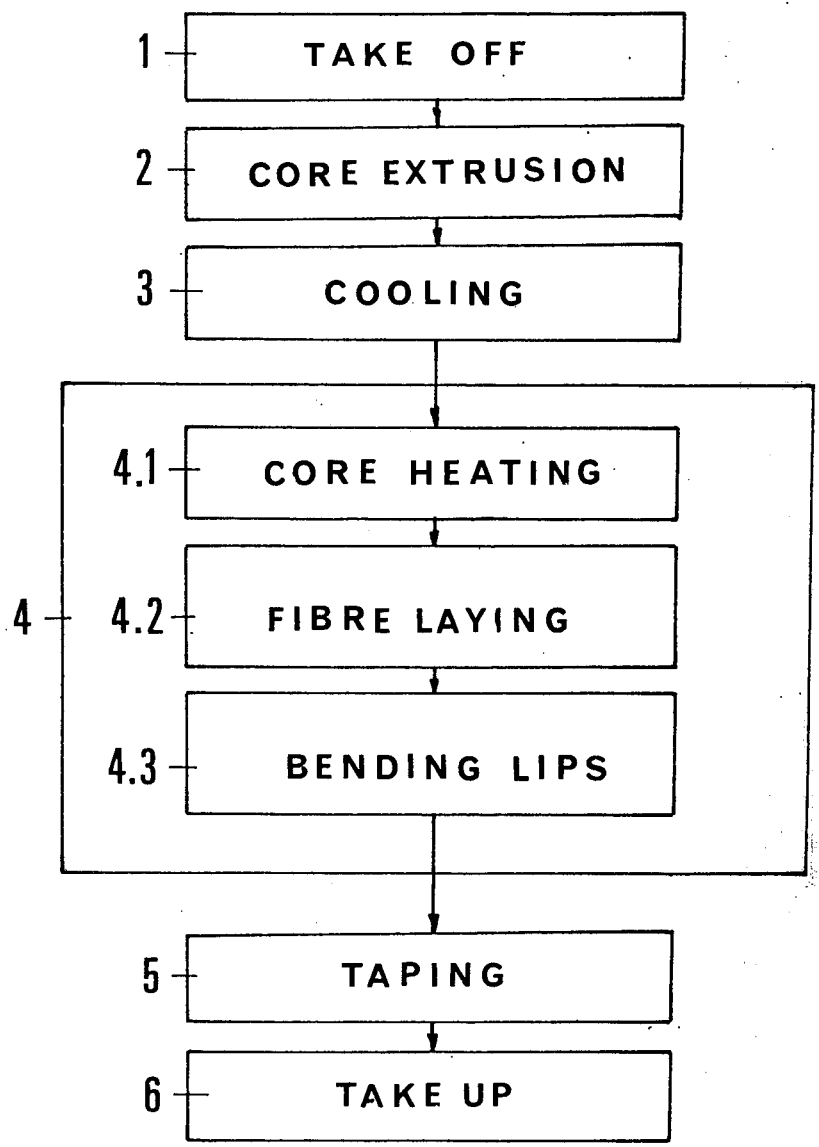
FIG. 1 illustrates the sequence of operations constituting the process according to the invention.
Figure 2:
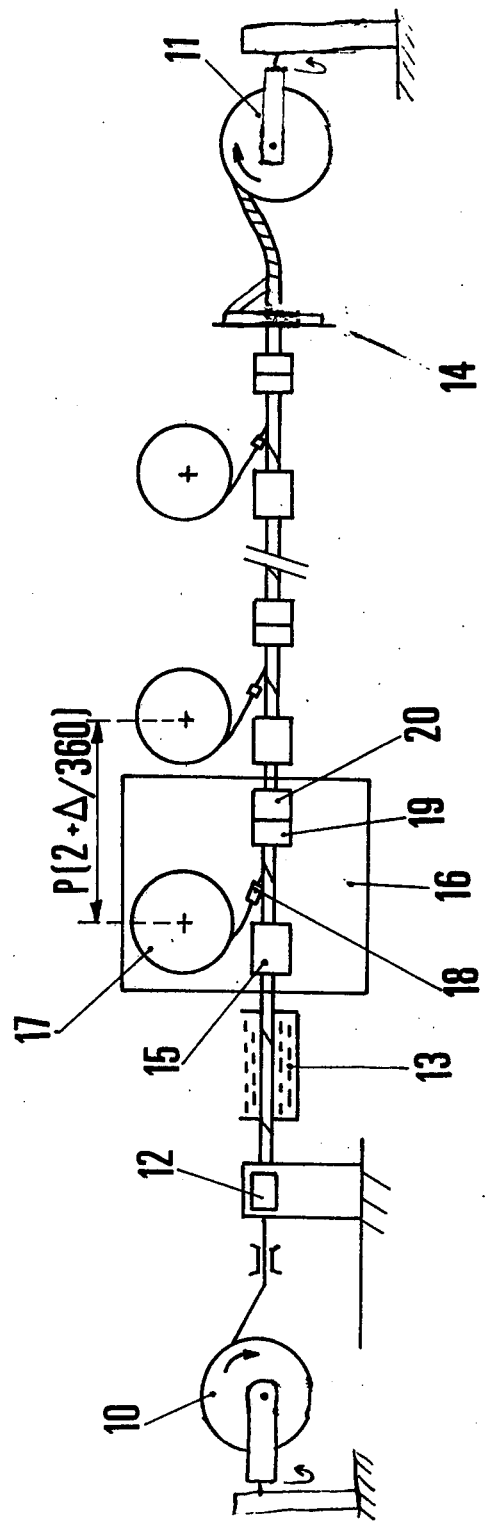
FIG. 2 illustrates an apparatus for carrying out the process.

FIGS. 1 and 2 illustrate respectively the sequence of the operations of the process according to the invention and the apparatus for carrying it out.

Operation 1 is the take off of the central armour serving as a mechanical support for the cable element for the supply reel 10 of FIG. 2. This core is made, for example, of XC 80 steel wire.

Operation 2 is the shaping of the dielectric core surrounding the core by means of the extruder 12. FIGS. 3.1 and 3.2 are two cross sectional views of the cable elements after extrusion in accordance with the process of the invention. In these two sections, 21 denotes the central armour consisting of a single longitudinally disposed steel wire, 22 denotes the thermoplastic dielectric core, for example of polyethylene, 23 denotes the positioning slot of rectangular cross-section, and 24 denotes any one of the grooves intended to receive an optical fibre. The slot 23 and the grooves 24 are wound in parallel relationship either helically or with alternate pitch. The vase of the grooves 24 is in the form of a triangle having a rounded apex, while the lateral, radially extending walls are separated by a distance between one and ten times the diameter of an optical fibre. In FIG. 3.1, the two edges of the grooves 24 have identical lips 25. In FIG. 3.2, on the other hand, a single edge has a lip 25 and the other edge has a recess 26 intended to receive the end of the lip 25 after it has been turned down. The slot 23 and the grooves 24 are regularly distributed around the circumference and are at an angle equal to Δ degrees to one another. This feature has no limiting character.

Operation 3 is a cooling of the dielectric after extrusion, generally performed in a water tank shown at 13 in FIG. 2, followed by drying in air, which may be hot (not shown).

The operations indicated in the box 4 of FIG. 1 are carried out by means of units for laying the optical fibre, which are denoted by 16 in FIG. 2. The number of laying units 16 is equal to the number of optical fibres. The units 16 are disposed in line in the apparatus for carrying out the process along the cable element, the said units being separated by a distance equal to $(n+\Delta/360)$ P, P being the pitch of the grooves and $\Delta$ the angular distance between two successive grooves, while n is an integer other than zero.

Operation 4.1 is the heating of the extruded core in the heater 15 of FIG. 2. The core is brought to a temperature such that the expansion of the grooves facilitates the laying of the optical fibres. When cooling, the core contracts and the length of the fibre only varies slightly, so that the residual tension on the fibre is reduced and may even be converted into a negative tension.

Operation 4.2 is the laying of an optical fibre in a groove 24. Each laying unit comprises a supply reel 17 driven by a motor as a function of the displacement of the core, and supplying the optical fibre at a linear velocity which is a function of the line speed. The optical fibre passes through a guide 18 and descends under its own weight to the bottom of the groove 24, which is held opposite the guide 18 by a positioning device 19 co-operating with the slot 23. Operation 4.2 is illustrated in FIG. 4. This figure shows a section of a cable element in the course of manufacture. A disc 19 fixed in relation to the frame of the cabling machine having a cylindrical central bore having the diameter of the circle circumscribed at the lips 25, maintains the centering element. A finger 33 fast with the disc 19 and entering the groove 23 maintains the empty groove 24 in the plane of the figure. The bore of the disc 19 is extended in the vertical plane by a rectilinear recess 31 defining a decreasing free height above the base of the groove 24. The optical fibre 34 supplied from the reel 17 (not shown in FIG. 4) passes through the guide 18 and becomes lodged by gravity, by way of the recess 31, in the groove 24. The heating element 20 heats the lips 25 before they are turned down. Two nozzles (not shown) are provided to apply air under pressure in parallel and perpendicular relationship to the axis of the optical fibre in order that no force (traction or friction) may be exerted on the fibre.

FIG. 5, which is a section along the line A—A in FIG. 4, shows the optical fibre 34 in position in the recess 31. A section taken downstream of that illustrated, for example along the line B—B, would show the optical fibre engaged in the groove 24. FIG. 5 corresponds to the positioning of the optical fibre in the first of the grooves 24 which is situated to the right of the positioning slot. A section taken through a disc 19 of the positioning unit of order n would show the finger 33 in the position obtained by shifts through an angle n from the vertical and would show n−1 optical fibres in position in their groove and the nth fibre about to become positioned.

Operation 4.3 is the bending over of the lips 25 on the groove 24. This operation is performed in the recess 32 in the heating disc 20. FIG. 4 shows that the height left free above the base of the groove 24 becomes insufficient to permit the passage of the lips 25 and causes them to collapse. Also, the walls of the recess 32 converge until the said recess has completely disappeared. The lips are therefore pressed down and box in the optical fibre without, however, immobilising it. This operation is facilitated by the softening due to the heating. A phase close to the end of the closing is illustrated in FIG. 6, which is a section along the transverse plane indicated by the line C—C in FIG. 4. Operation 4.3, which is carried out on a core whose grooves 24 have only a single lip, in accordance with FIG. 3.2, takes place with a disc 20, of which the recess has a slightly different profile from the preceding one. Similarly, the lip 25 is forced down on to the chamfered portion 26, which is intended to limit the movement.

In a modification of the performance of operations 4.2, the laying of the optical fibres in their groove can be guided by a helical capillary guide which is engaged in the groove and through which the optical fibre passes, the said guide being extended beyond the heating disc 20. In this way, the lips 25 are forced down on the groove containing the fibre guide and not on the groove containing only the fibre. The latter is thus protected by the fibre guide throughout the laying until the groove is closed. When a fibre guide of this type is used, the positioning slot 23 is unnecessary.

Operation 5 is a taping intended to maintain the lips 25 tightly together.

Operation 6 is the take up of the completed cable element on to the reel.

By means of the process according to the invention, cable elements of the type illustrated in the figures were produced at a speed of travel of between 1 and 4 m/min. The rotation of the core is made such as to obtain a pitch of about 200 mm of the helix occupied by the fibres. For the minimum value of the aforesaid line speed, the rotation is 5 r.p.m. The reels from which the optical fibres are supplied are of two sizes, namely of a diameter of 165 mm and of a diameter of 380 mm. The various stations for the performance of the process utilize commercially obtainable cable-making machine elements. The units for the laying of the fibres are described with reference to FIG. 4. The collar for the positioning of the fibres and the helical capillary fibre guide are members having low mechanical inertia which can follow any irregularities in the pitch of the helical grooves as obtained by extrusion.

What we claim:

1. Process for in-line production of cable elements comprising optical fibres, consisting of a rigid armour surrounded by a helically grooved core with optical fibres laid lengthwise in the grooves, characterized by the following steps:
   (1) slowly rotating and taking off the rigid armour
   (2) extruding around the armour a plastic material core with a grooved profile, of which at least some of the edges are prolonged by a lip,
   (3) cooling the extruded core
   (4) heating the extruded core
   (5) laying an optical fibre into a groove through a movable fibre guide
   (6) heating ofthe lip of the edge or edges of the groove according to step 5
   (7) turning down of the lip or lips at the periphery of the groove occupied by the fibre for the purpose of closing the access thereto
   (8) repetition of steps 4, 5, 6 and 7 on the successive grooves
   (9) winding on to a take-up reel.

2. Process according to claim 1, wherein a single lip is heated after the laying of an optical fibre.

3. Process according to claim 1, wherein two lips adjacent to the groove receiving the optical fibre are simultaneously heated after the laying of the fibre.

4. Process according to claim 1, wherein units for the laying of the optical fibre are equidistant.

5. Process according to claim 1, wherein the heating of the lips and the turning down thereof are effected by means of a heating disc which has a recess over a part of its height.

6. Process according to claim 1, wherein the movable fibre guide is a capillary tube disposed in the groove and extending beyond the beginning of the turned down lip or lips.

* * * * *